(12) United States Patent
Fu

(10) Patent No.: US 7,871,053 B1
(45) Date of Patent: Jan. 18, 2011

(54) FIXING DEVICE

(75) Inventor: Tung-Cheng Fu, Taipei Hsien (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 0 days.

(21) Appl. No.: 12/612,057

(22) Filed: Nov. 4, 2009

(51) Int. Cl.
*F16M 11/00* (2006.01)
(52) U.S. Cl. .................. 248/638; 248/674; 248/694
(58) Field of Classification Search .......... 248/694, 248/638, 674, 634; 720/694; 360/78.09; 361/679.36
See application file for complete search history.

(56) References Cited

U.S. PATENT DOCUMENTS

| | | | | |
|---|---|---|---|---|
| 6,883,175 | B2 * | 4/2005 | Liao et al. ............... | 720/692 |
| 2004/0168180 | A1 * | 8/2004 | Wei ......................... | 720/692 |
| 2004/0194121 | A1 * | 9/2004 | Liao et al. ............... | 720/694 |
| 2006/0048175 | A1 * | 3/2006 | Guo et al. ............... | 720/694 |
| 2006/0067043 | A1 * | 3/2006 | Kotani et al. ........... | 361/685 |
| 2007/0014087 | A1 * | 1/2007 | Kwak et al. ............. | 361/685 |
| 2008/0086966 | A1 * | 4/2008 | Stevens et al. .......... | 52/347 |
| 2010/0148634 | A1 * | 6/2010 | Ichikawa ................. | 310/348 |

* cited by examiner

*Primary Examiner*—Ramon O Ramirez
(74) *Attorney, Agent, or Firm*—Chun-Ming Shih

(57) ABSTRACT

A fixing device used for mounting a storage device includes a support bracket and a buffer structure attached to the support bracket. The buffer structure includes a buffer member and a metal cushion. The buffer member is positioned on a first surface of the support bracket, and the metal cushion is positioned on a second surface of the support bracket. The second surface is opposite to the first surface. The metal cushion has two elastic portions. A bottom surface of each elastic portion faces the second surface. A distance is formed between the bottom surface and the second surface.

6 Claims, 3 Drawing Sheets

FIXING DEVICE

BACKGROUND

The present invention relates to fixing devices and, more particularly, to a fixing device used for mounting a storage device.

Storage devices such as a hard disk drive (HDD), which are auxiliary memory device for computers, reproduce information stored in a magnetic disk or record new information on the magnetic disk by way of a magnetic head. A rotating speed of the hard disk requires to be higher and higher. However, when the hard disk drive is fixed on a support bracket without any buffer for protection or is assembled in an improper way, the hard disk drive is prone to generate vibration once the hard disk drive works. If the hard disk drive vibrates for a long time, the magnetic head of the hard disk drive may be damaged or a magnetic track of the magnetic disk may be scraped. As a result, information stored in the hard disk drive may be lost. Additionally, a noise generated by the hard disk drive would disturb a user at night.

BRIEF SUMMARY

The present invention provides a fixing device capable of reducing shock and noise generated by a storage device.

To achieve at least one of the above-mentioned advantages or other advantages, the present invention provides a fixing device used for mounting at least one storage device. The fixing device includes a support bracket and a buffer structure attached to the support bracket. The buffer structure includes a buffer member and a metal cushion. The buffer member is positioned on a first surface of the support bracket, and the metal cushion is positioned on a second surface of the support bracket. The second surface is opposite to the first surface. The metal cushion has two elastic portions. A bottom surface of each elastic portion faces the second surface. A distance is formed between the bottom surface and the second surface.

In an embodiment of the present invention, the buffer member is made of foam.

In another embodiment of the present invention, the metal cushion is C-shaped.

In another embodiment of the present invention, the fixing member further includes a screw. The screw is passed through the metal cushion and the buffer member. The elastic portions abut against the screw.

The fixing device is fixed to the storage device, the buffer member and the metal cushion of the fixing device can reduce shock and noise generated by the storage device.

BRIEF DESCRIPTION OF THE DRAWINGS

These and other features and advantages of the various embodiments disclosed herein will be better understood with respect to the following description and drawings, in which like numbers refer to like parts throughout, and in which.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION

Figure 1:
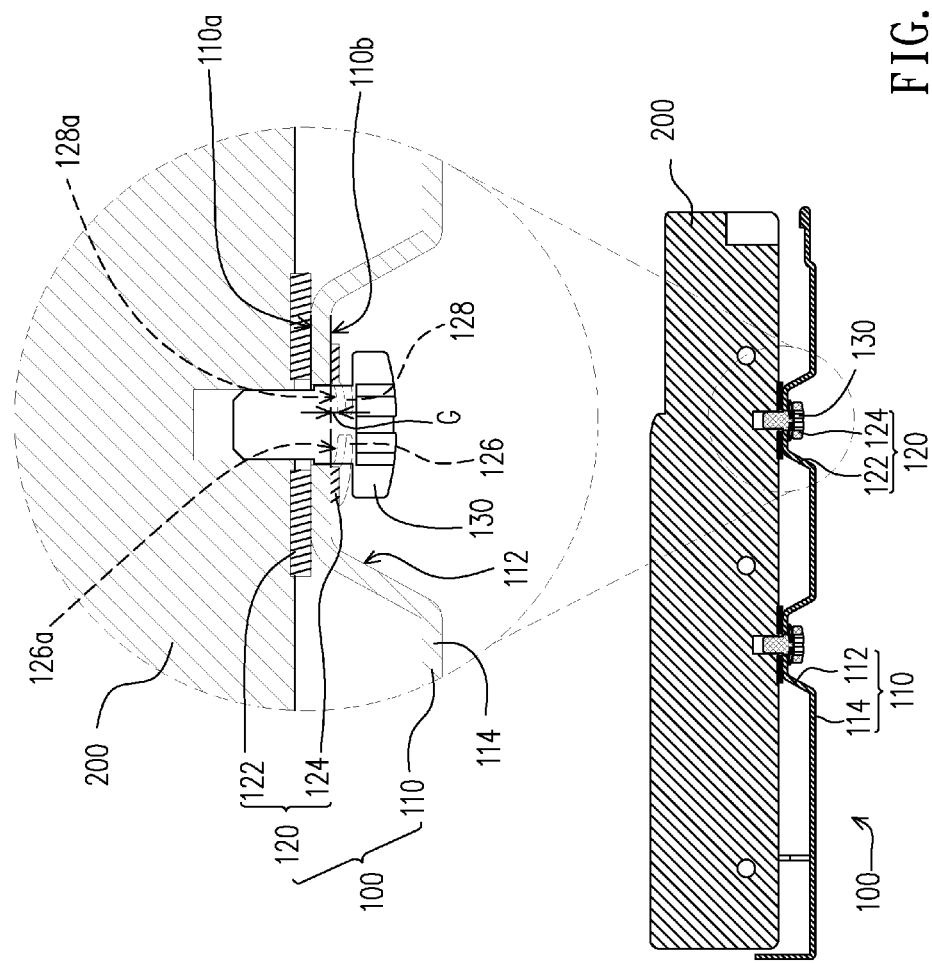
FIG. 1 is a schematic, cross-sectional view of a fixing device in accordance with the present invention.
Figure 2:
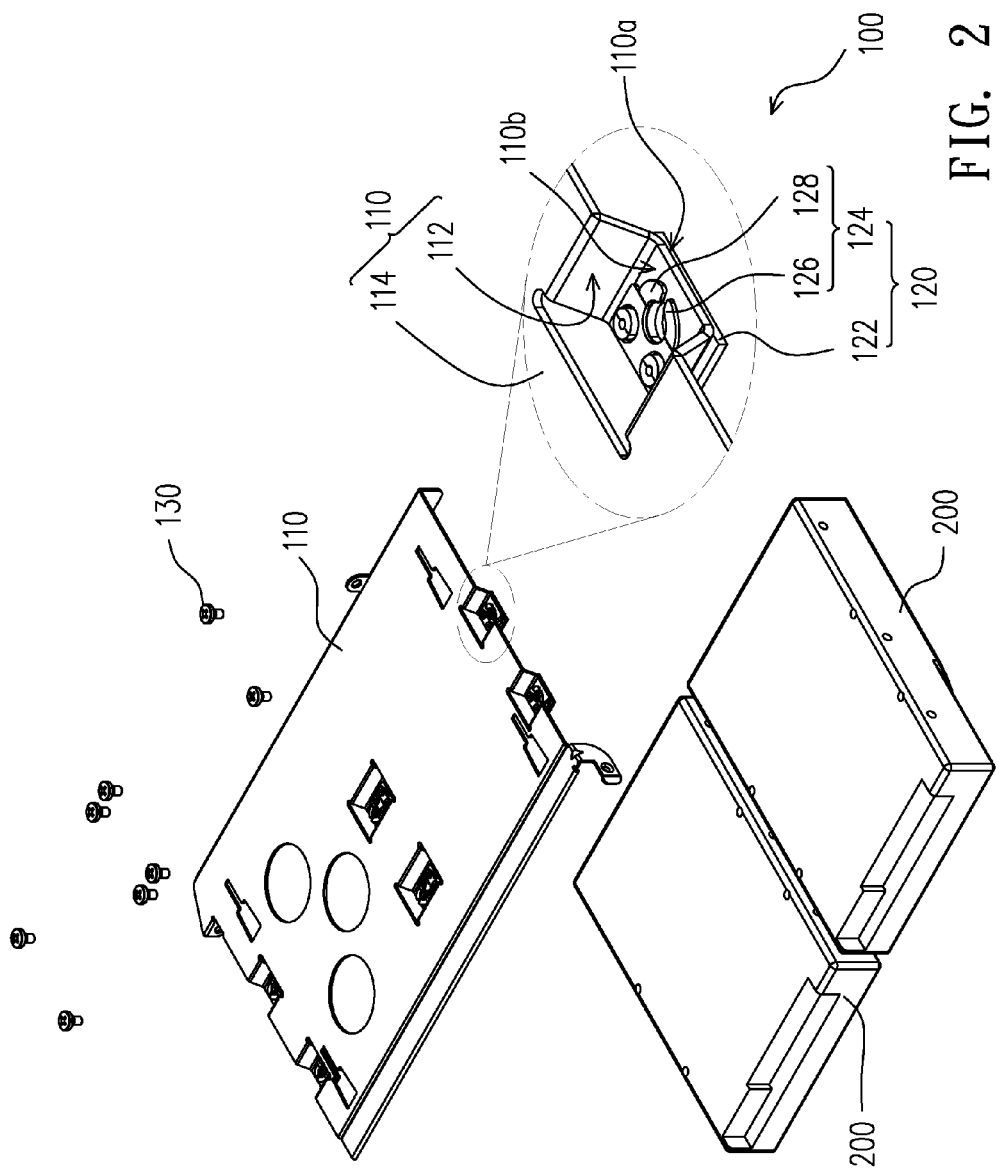
FIG. 2 is an exploded perspective view of the fixing device and two storing devices.
Figure 3:
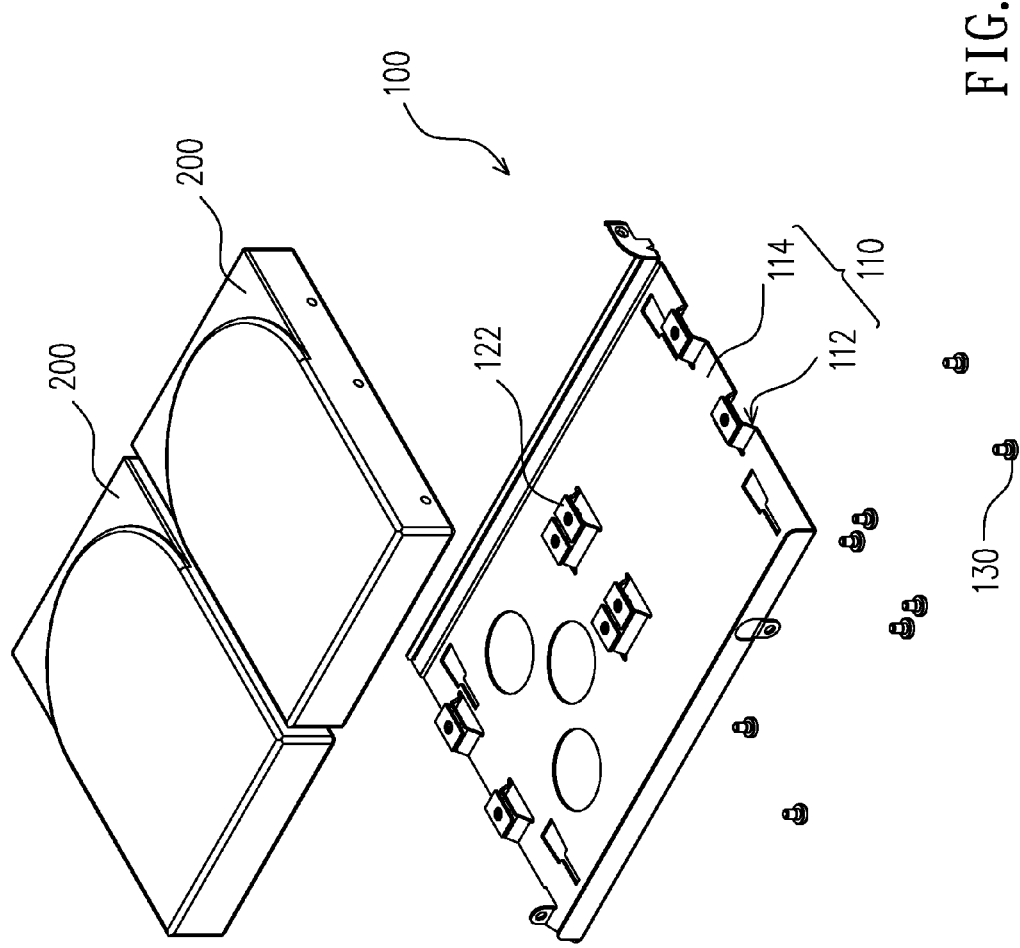
FIG. 3 is similar to FIG. 2, but viewed from another aspect.

FIG. 1 is a schematic, cross-sectional view of a fixing device in accordance with the present invention. FIG. 2 is an exploded perspective view of the fixing device and two storing devices. FIG. 3 is similar to FIG. 2, but viewed from another aspect. Referring to FIGS. 1 through 3, a fixing device 100 of this embodiment is used for mounting at least one storage device 200. A number of the at least one storage device 200 in FIGS. 1 and 3 is two. The storage device 200 may be a CD-ROM drive, a floppy disk drive, a hard disk drive, or other storage devices according to current requirements.

The fixing device 100 includes a support bracket 110 and a buffer structure 120 attached to the support bracket 110. The buffer structure 120 includes a buffer member 122 and a metal cushion 124. The buffer member 122 is positioned on a first surface 110a of the support bracket 110, and the metal cushion 124 is positioned on a second surface 110b of the support bracket 110. The second surface 110b is opposite to the first surface 110a. The metal cushion 124 has two elastic portions 126, 128. A bottom surface 126a of the elastic portion 126 and a bottom surface 128a of the elastic portion 128 face the second surface 110b. A predetermined distance G is formed between the bottom surfaces 126a, 128a and the second surface 110b. That is, the bottom surfaces 126a, 128a are spaced apart from the second surface 110b.

The support bracket 110 may be substantially rectangular, and may be a tray of the storage device 200. The buffer member 122 is made of shock absorbing materials, such as foam. The foam is disposed between the storage device 200 and the support bracket 110, so as to act as a shock absorber. In addition, in this embodiment, the metal cushion 124 is riveted to the second surface 110b of the support bracket 110. The metal cushion 124 is substantially C-shaped. Alternatively, the metal cushion 124 may have a U shape, an inverted U shape, or other shapes. The metal cushion 124 may be fixed to the second surface 110b of the support bracket 110 via welding or other methods.

Additionally, the fixing device 100 further includes a screw 130. The screw 130 is passed through the buffer member 122, the support bracket 110, a metal cushion 124, and then engaged into a threaded hole of the storage device 200. It should be pointed out that, the elastic portions 126, 128 abut against the screw 130 after the screw 130 is engaged into the storage device 200, thereby preventing the screw 130 from loosing.

As shown in FIGS. 1 through 3, the support bracket 110 of this embodiment has a plurality of protruding portions 112 and a main body 114 lower than the protruding portions 112. The buffer member 122 and the metal cushion 124 are respectively positioned on two opposite surfaces of the protruding portions 112. The storage device 200 is mounted on the buffer member 122. The buffer member 122 abuts against the protruding portions 112 and the storage device 200. Alternatively, a shape of the support bracket 110 may vary according to the current requirements. For example, the support bracket 110 may be a flat board.

During using or transportation of the storage device 200, the storage device 200 may vibrate or may be impacted by an external force. Since the buffer member 122 abuts against the storage device 200, the buffer member 122 is elastically deformed. Therefore, shock energy on the buffer member 122 may be absorbed by the deformation of the buffer member 122. However, if the storage device 200 works for a long time or is impacted by a large external force, the single buffer member 122 may be unable to prevent the storage device 200 from impacting the fixing device 100. Thus, the storage device 200 may be damaged.

Specially, the predetermined distance G is formed between the elastic portions 126, 128 of the metal cushion 124 and the second surface 110b of the support bracket 110. When the storage device 200 vibrates and impacts the support bracket 110, the elastic portions 126, 128 provides a large buffer force, eliminating or reducing the impact force applied on the storage device 200 and the support bracket 110. Therefore, the elastic portions 126, 128 can effectively protect the storage device 200 against damage by the support bracket 110.

In summary, since the configuration of the elastic portions 126, 128 spaced apart from the support bracket 110 with a predetermined distance, the shock and noise generated by the storage device 200 is reduced, and the storage device 200 can also be protected.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fixing device used for mounting at least one storage device, comprising:
   a support bracket; and
   a buffer structure attached to the support bracket, the buffer structure comprising:
   a buffer member positioned on a first surface of the support bracket; and
   a metal cushion positioned on a second surface of the support bracket, the second surface being opposite to the first surface, the metal cushion having two elastic portions, a bottom surface of each elastic portion facing the second surface, and a distance being formed between the bottom surface and the second surface.

2. The fixing device according to claim 1, wherein the buffer member is made of foam.

3. The fixing device according to claim 1, wherein the buffer member is made of shock absorbing materials.

4. The fixing device according to claim 1, wherein the metal cushion is C-shaped.

5. The fixing device according to claim 1, wherein the metal cushion has a U shape or an inverted U shape.

6. The fixing device according to claim 1, further comprising a screw, the screw being passed through the metal cushion and the buffer member, the elastic portions abutting against the screw.

* * * * *